(12) United States Patent
Skinkle (10) Patent No.: US 10,627,276 B2
(45) Date of Patent: Apr. 21, 2020

(54) ASYMMETRIC FLOWMETER AND RELATED METHOD

(71) Applicant: Micro Motion, Inc., Boulder, CO (US)

(72) Inventor: David Skinkle, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 72 days.

(21) Appl. No.: 15/776,180

(22) PCT Filed: Dec. 11, 2015

(86) PCT No.: PCT/US2015/065356
§ 371 (c)(1),
(2) Date: May 15, 2018

(87) PCT Pub. No.: WO2017/099810
PCT Pub. Date: Jun. 15, 2017

(65) Prior Publication Data
US 2019/0063974 A1    Feb. 28, 2019

(51) Int. Cl.
*G01F 1/84*       (2006.01)
*G01F 15/18*      (2006.01)

(52) U.S. Cl.
CPC .......... *G01F 1/8404* (2013.01); *G01F 1/8409* (2013.01); *G01F 1/8413* (2013.01); *G01F 15/18* (2013.01)

(58) Field of Classification Search
CPC .................... G01F 1/84; G01F 15/18
See application file for complete search history.

(56) References Cited

U.S. PATENT DOCUMENTS

| | | | |
|---|---|---|---|
| 4,491,025 A | 1/1985 | Smith et al. | |
| 4,768,385 A | 9/1988 | Cage | |
| 4,782,711 A | 11/1988 | Pratt | |
| 5,275,061 A | 1/1994 | Young et al. | |
| 5,546,814 A * | 8/1996 | Mattar | F16L 41/03 73/861.355 |
| 5,661,232 A | 8/1997 | Van Cleve et al. | |
| 8,931,353 B2 | 1/2015 | Mokady et al. | |
| 2011/0138929 A1 | 6/2011 | Young | |

FOREIGN PATENT DOCUMENTS

| | | | |
|---|---|---|---|
| WO | 8900678 | * | 1/1989 |
| WO | 1989000678 A1 | | 1/1989 |
| WO | 0165213 | * | 9/2001 |
| WO | 2001065213 A1 | | 9/2001 |

* cited by examiner

*Primary Examiner* — Jewel V Dowtin
(74) *Attorney, Agent, or Firm* — The Ollila Law Group LLC (57) ABSTRACT

A method for creating an asymmetric flowmeter manifold (202, 202') is provided. The method comprises the steps of defining at least one flowmeter (5) application parameter. The method also comprises determining an area for at least a first flow path (402) and a second flow path (402'), and forming the asymmetric manifold with the determined flow path areas.

20 Claims, 7 Drawing Sheets

ASYMMETRIC FLOWMETER AND RELATED METHOD

TECHNICAL FIELD

The present invention relates to flowmeters, and more particularly to an asymmetrical flowmeter manifold and related method.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Meter electronics connected to the driver generate a drive signal to operate the driver and determine a mass flow rate and other properties of a material from signals received from the pickoffs. The driver may comprise one of many well-known arrangements; however, a magnet and an opposing drive coil have received great success in the flowmeter industry. An alternating current is passed to the drive coil for vibrating the conduit(s) at a desired flow tube amplitude and frequency. It is also known in the art to provide the pickoffs as a magnet and coil arrangement very similar to the driver arrangement. However, while the driver receives a current which induces a motion, the pickoffs can use the motion provided by the driver to induce a voltage. The magnitude of the time delay measured by the pickoffs is very small; often measured in nanoseconds. Therefore, it is necessary to have the transducer output be very accurate.

A dual-tube Coriolis sensor is typically designed with symmetric features for the flow path and structural components of the sensor. This approach results in a balanced sensor through matched elastic and inertial loads. An imbalance in the Coriolis forces could occur if the tubes had unmatched flow rates, which could lead to reduced flow accuracy and susceptibility to external loads and vibrations.

The constraint of a symmetric flow path design limits sensor compactness, manufacturing approaches for the manifold, and flexibility of sensor layout to best match certain integration requirements. Since tube axis parallelism is required, dual tube sensors have not been designed with single-piece manifolds as would often be produced with metal or plastic parts by a permanent mold. The result is a significant limitation on cost reduction and potential manufacturing approaches.

Therefore, there is a need in the art for an apparatus and related method to allow asymmetric flow through a flowmeter, yet provide accurate flowmeter readings. Additionally, asymmetric manifold design allows for more compact and effective flowmeter design.

The present invention overcomes the above difficulties and other problems, and an advance in the art is achieved.

SUMMARY OF THE INVENTION

A method for creating an asymmetric flowmeter manifold is provided according to an embodiment. The method comprises the steps of defining at least one flowmeter application parameter, determining an area for at least a first flow path and a second flow path, and forming the asymmetric manifold with the determined flow path areas.

A flowmeter configured to measure a property of a process fluid therein is provided according to an embodiment. The flowmeter comprises a sensor assembly in communication with a meter electronics comprising a processing system and a storage system. A plurality of pickoffs and a driver are affixed to conduits. At least one asymmetric manifold is in fluid communication with the conduits, comprising at least a first flow path and a second flow path.

ASPECTS

According to an aspect, a method for creating an asymmetric flowmeter manifold, comprises the steps of: defining at least one flowmeter application parameter; determining an area for at least a first flow path and a second flow path; and forming the asymmetric manifold with the determined flow path areas.

Preferably, the application parameters comprise at least a fluid viscosity range and a flow rate range.

Preferably, an area of the first flow path is greater than an area of the second flow path.

Preferably, at least one flow path comprises a circular cross-section.

Preferably, at least one flow path comprises a non-circular cross-section.

Preferably, the method comprises the step of forming a first port, wherein the first and second flow paths are disposed approximately 90 degrees to the first port.

Preferably, the step of forming the manifold comprises forming the manifold of a single piece of material.

Preferably, the step of forming the manifold of a single piece of material comprises permanent mold casting.

Preferably, the step of forming the manifold of a single piece of material comprises injection molding.

Preferably, flow rates of a fluid passing through the first flow path and the second flow path are substantially equal.

According to an aspect, a flowmeter configured to measure a property of a process fluid therein, comprises: a sensor assembly in communication with a meter electronics comprising a processing system and a storage system; a plurality of pickoffs affixed to conduits; a driver affixed to flowmeter conduits; and at least one asymmetric manifold in fluid communication with the conduits, wherein the at least one asymmetric manifold comprises at least a first flow path and a second flow path.

Preferably, the flowmeter comprises a Coriolis mass flowmeter.

Preferably, an area of the first flow path is greater than an area of the second flow path.

Preferably, at least one flow path comprises a circular cross-section.

Preferably, at least one flow path comprises a non-circular cross-section.

Preferably, the flowmeter comprises a first port, wherein the first and second flow paths are disposed approximately 90 degrees to the first port.

Preferably, the at least one asymmetric manifold comprises a single piece of material.

Preferably, the at least one asymmetric manifold comprises a permanent mold casting.

Preferably, the at least one asymmetric manifold comprises injection molding.

Preferably, flow rates of a fluid passing through the first flow path and the second flow path are substantially equal.

Preferably, the flowmeter additionally comprises a symmetric manifold.

DETAILED DESCRIPTION OF THE INVENTION

FIGS. 1-6 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention, and will appreciate that the features described below can be combined in various ways to form multiple variations of the invention. As a result, the invention is not limited to the specific examples described below, but only by the claims and their equivalents.

Figure 1:
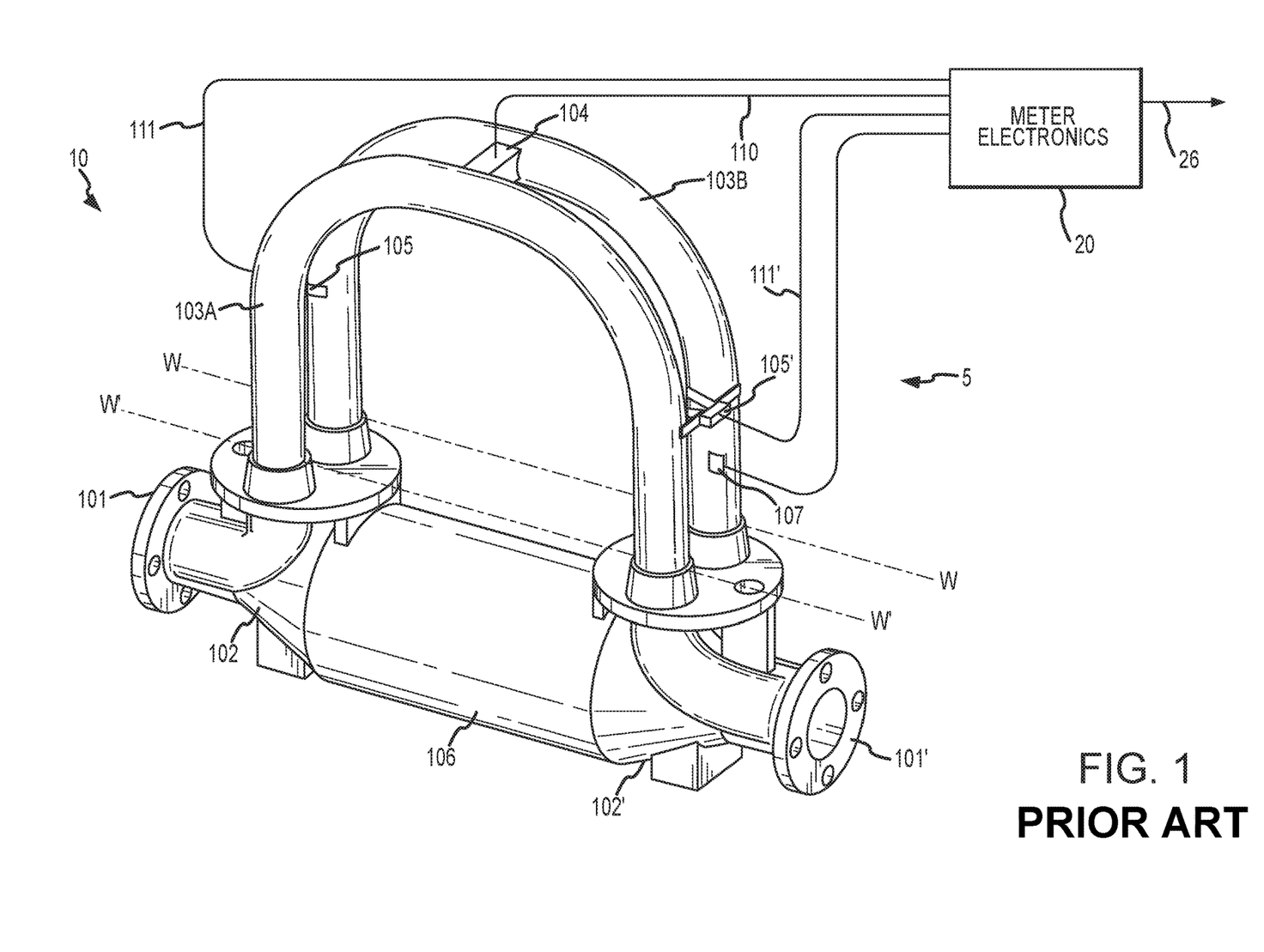
FIG. 1 shows a prior art vibrating sensor assembly according to an embodiment.

FIG. 1 illustrates an example of a prior art flowmeter 5 in the form of a Coriolis flowmeter comprising a sensor assembly 10 and one or more meter electronics 20. The one or more meter electronics 20 are connected to sensor assembly 10 to measure a characteristic of a flowing material, such as, for example, density, pressure, mass flow rate, volume flow rate, totalized mass flow, temperature, and other information.

The sensor assembly 10 includes a pair of flanges 101 and 101', manifolds 102 and 102', and conduits 103A and 103B. Manifolds 102, 102' are affixed to opposing ends of the conduits 103A, 103B. The manifolds 102, 102' are multi-piece assemblies. Flanges 101 and 101' of the present example are affixed to manifolds 102 and 102'. Manifolds 102 and 102' of the present example are affixed to opposite ends of spacer 106. The spacer 106 maintains the spacing between manifolds 102 and 102' in the present example to prevent undesired vibrations in conduits 103A and 103B. The conduits 103A and 103B extend outwardly from the manifolds 102 and 102' in a parallel fashion. When the sensor assembly 10 is inserted into a pipeline system (not shown) which carries the flowing material, the material enters sensor assembly 10 through flange 101, passes through inlet manifold 102 where the total amount of material is directed to enter conduits 103A and 103B, flows through conduits 103A and 103B and back into outlet manifold 102' where it exits the sensor assembly 10 through the flange 101'.

The sensor assembly 10 includes a driver 104. The driver 104 is affixed to conduits 103A and 103B in a position where the driver 104 can vibrate the conduits 103A, 103B in the drive mode. More particularly, the driver 104 includes a first driver component (not shown) affixed to conduit 103A and a second driver component (not shown) affixed to conduit 103B. The driver 104 may comprise one of many well-known arrangements, such as a magnet mounted to the conduit 103A and an opposing coil mounted to the conduit 103B.

In the present example, the drive mode may be the first out of phase bending mode and the conduits 103A and 103B would be selected and appropriately mounted to inlet manifold 102 and outlet manifold 102' so as to provide a balanced system having substantially the same mass distribution, moments of inertia, and elastic moduli about bending axes W-W and W'-W', respectively. In the present example, where the drive mode is the first out of phase bending mode, the conduits 103A and 103B are driven by the driver 104 in opposite directions about their respective bending axes W-W and W'-W'. A drive signal in the form of an alternating current can be provided by one or more meter electronics 20, such as for example via lead 110, and passed through the coil to cause both conduits 103A, 103B to oscillate.

The sensor assembly 10 shown includes a pair of pickoffs 105, 105' that are affixed to conduits 103A, 103B. More particularly, a first pickoff component (not shown) is located on conduit 103A and a second pickoff component (not shown) is located on conduit 103B. In the embodiment depicted, the pickoffs 105, 105' may be electromagnetic detectors, for example—pickoff magnets and pickoff coils that produce pickoff signals that represent the velocity and position of the conduits 103A, 103B. For example, the pickoffs 105, 105' may supply pickoff signals to the one or more meter electronics via pathways 111, 111'. Those of ordinary skill in the art will appreciate that the motion of the conduits 103A, 103B is proportional to certain characteristics of the flowing material, for example, the mass flow rate and density of the material flowing through the conduits 103A, 103B.

In the prior art example shown in FIG. 1, the one or more meter electronics 20 receive the pickoff signals from the pickoffs 105, 105'. Path 26 provides an input and an output means that allows one or more meter electronics 20 to interface with an operator. The one or more meter electronics 20 measure a characteristic of a flowing material, such as, for example, a phase difference, a frequency, a time delay, a density, a mass flow rate, a volume flow rate, a totalized mass flow, a temperature, a meter verification, pressure, and other information. More particularly, the one or more meter electronics 20 receive one or more signals, for example, from pickoffs 105, 105' and one or more temperature sensors 107, such as a resistive temperature detector (RTD), and use this information to measure a characteristic of a flowing material.

Figure 2:
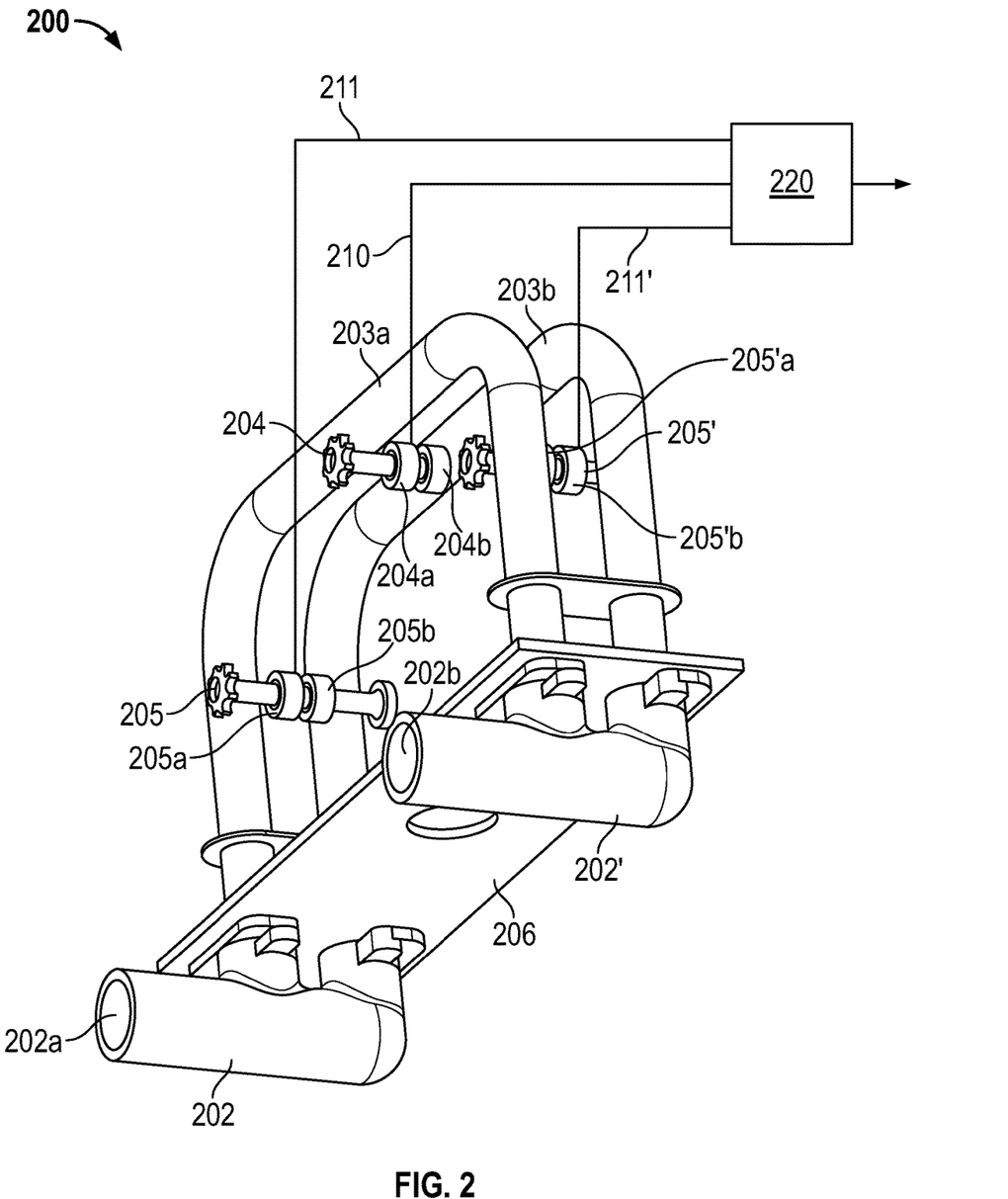
FIG. 2 shows a sensor assembly according to an embodiment of the invention.

FIG. 2 illustrates an example of a sensor assembly 200 for a flowmeter 5 according to an embodiment. The sensor assembly 200 includes a pair of asymmetric manifolds 202 and 202', and a pair of conduits 203A and 203B. Asymmetric manifolds 202, 202' are affixed to opposing ends of the conduits 203A, 203B. The manifolds 202, 202' can be constructed as a single piece. Asymmetric manifolds 202 and 202' may be affixed to opposite ends of a spacer 206 in an embodiment. The spacer 206 maintains the spacing between manifolds 202 and 202' and aids in preventing undesired vibrations in conduits 203A and 203B. The conduits 203A and 203B extend outwardly from the asymmetric manifolds 202 and 202' in a substantially parallel fashion. When the sensor assembly 200 is inserted into a pipeline system (not shown) which carries a flowing process material, the material enters sensor assembly 200 through a first opening 202A, passes through inlet manifold 202 where the total amount of material is directed to enter conduits 203A and 203B, flows through conduits 203A and 203B and back into outlet manifold 202' where it exits the sensor assembly 200 through a second opening 202B.

The sensor assembly 200 includes a driver 204. The driver 204 is affixed to conduits 203A and 203B in a position where the driver 204 can vibrate the conduits 203A, 203B in the drive mode. More particularly, the driver 204 includes, in some embodiments, a first driver component 204A affixed to conduit 203A and a second driver component 204B affixed to conduit 203B. The driver 204 may comprise one of many well-known arrangements, such as a magnet mounted to the conduit 203A and an opposing coil mounted to the conduit 203B, for example without limitation.

In an embodiment, the drive mode is the first out of phase bending mode and the conduits 203A and 203B are preferably selected and appropriately mounted to inlet manifold 202 and outlet manifold 202' so as to provide a balanced system. However, unlike the prior art, the asymmetric manifolds 202, 202' are, as indicated by their name, asymmetric, yet still provide a balanced flow to the conduits 203A and 203B. In an embodiment, the conduits 203A and 203B have substantially the same mass distribution, moments of inertia, and elastic moduli about respective bending axes. In another embodiment, the conduits 203A and 203B do not have the same mass distribution, moments of inertia, and elastic moduli about respective bending axes in order to compensate for asymmetric flow. In an example, where the drive mode is the first out of phase bending mode, the conduits 203A and 203B are driven by the driver 204 in opposite directions about their respective bending axes. A drive signal in the form of an alternating current can be provided by one or more meter electronics 220, such as for example via lead 210, and passed through the coil to cause both conduits 203A, 203B to oscillate. Those of ordinary skill in the art will appreciate that other driver types and drive modes may be used within the scope of the present invention.

The sensor assembly 200 shown includes a pair of pickoffs 205, 205' that are affixed to conduits 203A, 203B. More particularly, a first pickoff component 205A, 205'A is located on conduit 203A and a second pickoff component 205B, 205'B is located on conduit 203B. In the embodiment depicted, the pickoffs 205, 205' may be electromagnetic detectors, for example—pickoff magnets and pickoff coils that produce pickoff signals that represent the velocity and position of the conduits 203A, 203B. For example, the pickoffs 205, 205' may supply pickoff signals to the one or more meter electronics via pathways 211, 211'. Those of ordinary skill in the art will appreciate that the motion of the conduits 203A, 203B is proportional to certain characteristics of the flowing material—for example, the mass flow rate and density of the material flowing through the conduits 203A, 203B.

It should be appreciated that while the sensor assembly 200 described above comprises flow conduits 203A, 203B comprising a curved configuration, the present invention may be implemented with a flowmeter comprising a straight flow conduit configuration. Therefore, the particular embodiment of the sensor assembly 200 described above is merely one example and should in no way limit the scope of the present invention.

Figure 3:
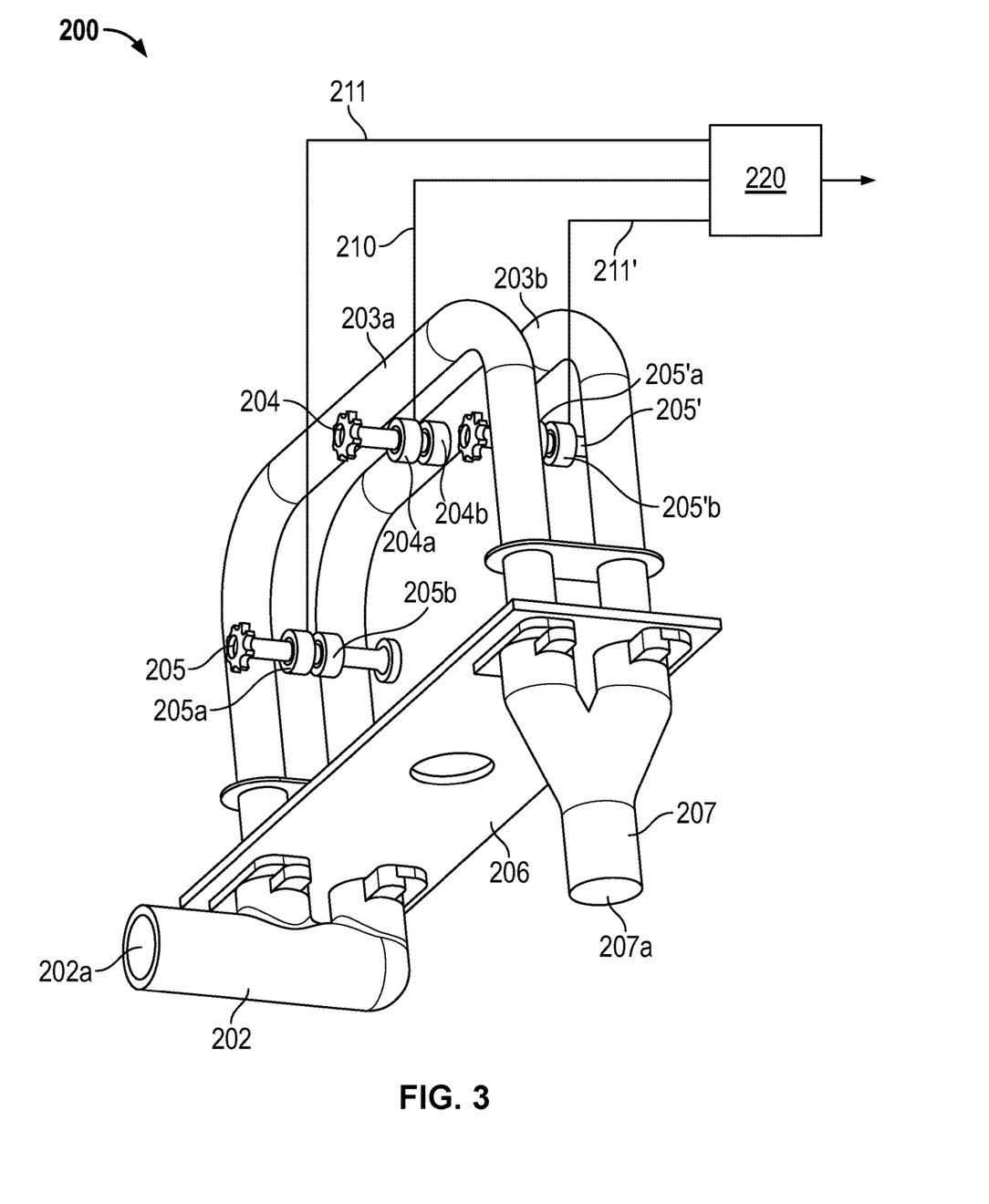
FIG. 3 shows a sensor assembly according to an alternate embodiment of the invention.

FIG. 3 illustrates an example of a sensor assembly 200 for a flowmeter 5 according to an embodiment. This embodiment is similar to the embodiment illustrated in FIG. 2, however only one asymmetric manifold 202, 202' is present. The opposite manifold is a symmetric manifold 207. In an embodiment, the symmetric manifold 207 is an inlet manifold, while the asymmetric manifold 202 is an outlet manifold. In another embodiment, the symmetric manifold 207 is an outlet manifold, while the asymmetric manifold 202 is an inlet manifold. The symmetric manifold 207 is shown with the port 207a pointing downward in relation to the sensor assembly 200. This is only one contemplated arrangement, and the opening may project in any number of directions. The same applies to port 202a.

Figure 4:
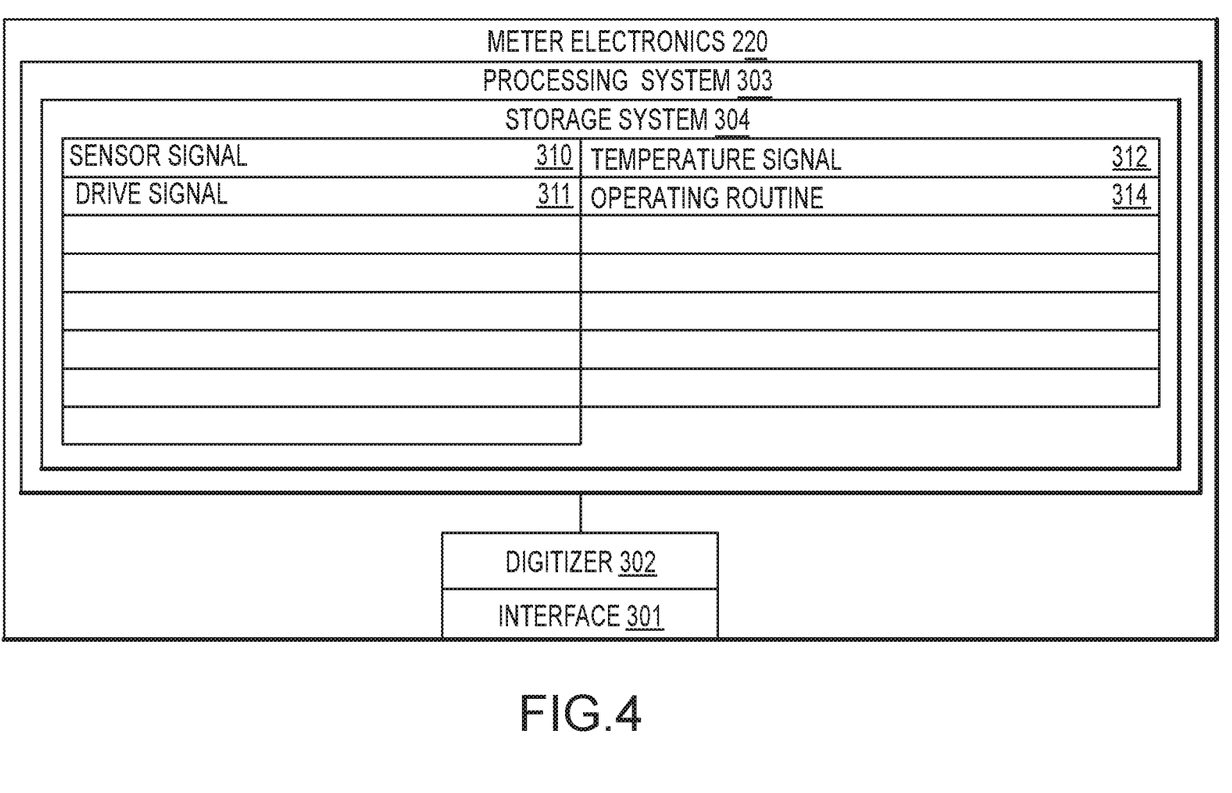
FIG. 4 shows flowmeter electronics according to an embodiment.

FIG. 4 shows the meter electronics 220 according to an embodiment. The meter electronics 220 can include an interface 301 and a processing system 303. The processing system 303 may include a storage system 304. The storage system 304 may comprise an internal memory and/or may comprise an external memory. The meter electronics 220 can generate a drive signal 311 and supply the drive signal 311 to the driver 204. In addition, the meter electronics 220 can receive sensor signals 310 from the pickoffs 205, 205', such as pickoff/velocity sensor signals, strain signals, optical signals, or any other signals or sensors known in the art. In some embodiments, the sensor signals 310 can be received from the driver 204. The meter electronics 220 can operate as a densitometer or can operate as a mass flowmeter, including operating as a Coriolis flowmeter. It should be appreciated that the meter electronics 220 may also operate as some other type of vibrating sensor assembly and the particular examples provided should not limit the scope of the present invention. The meter electronics 220 can process the sensor signals 310 in order to obtain flow characteristics of the material flowing through the flow conduits 203A, 203B. In some embodiments, the meter electronics 220 may receive a temperature signal 312 from one or more resistive temperature detectors (RTD) sensors or other temperature sensors (not shown), for example.

The interface 301 can receive the sensor signals 310 from the driver 204 or pickoffs 205, 205', via leads 210, 211, 211'. The interface 301 may perform any necessary or desired signal conditioning, such as any manner of formatting, amplification, buffering, etc. Alternatively, some or all of the signal conditioning can be performed in the processing system 303. In addition, the interface 301 can enable communications between the meter electronics 220 and external devices. The interface 301 can be capable of any manner of electronic, optical, or wireless communication.

The interface 301 in one embodiment can include a digitizer 302, wherein the sensor signal comprises an analog sensor signal. The digitizer 302 can sample and digitize the analog sensor signal and produce a digital sensor signal. The digitizer 302 can also perform any needed decimation, wherein the digital sensor signal is decimated in order to reduce the amount of signal processing needed and to reduce the processing time.

The processing system 303 can conduct operations of the meter electronics 220 and process flow measurements from the sensor assembly 200. The processing system 303 can execute one or more processing routines, such as a general operating routine 314.

The processing system 303 can comprise a general purpose computer, a micro-processing system, a logic circuit, or some other general purpose or customized processing device. The processing system 303 can be distributed among multiple processing devices. The processing system 303 can include any manner of integral or independent electronic storage medium, such as storage system 304.

The processing system 303 processes the sensor signals 310 in order to generate a drive signal 311, among other things. The drive signal 311 is supplied to the driver 204 via lead 210 in order to vibrate the associated flow tube(s), such as the conduits 203A, 203B.

It should be understood that the meter electronics 220 may include various other components and functions that are generally known in the art. These additional features are omitted from the description and the figures for the purpose of brevity. Therefore, the present invention should not be limited to the specific embodiments shown and discussed.

The techniques by which vibrating sensor assemblies, such as for example, Coriolis flowmeters or densitometers, measure a characteristic of a flowing material are well understood; therefore, a detailed discussion is omitted for brevity of this description.

Figure 5A:
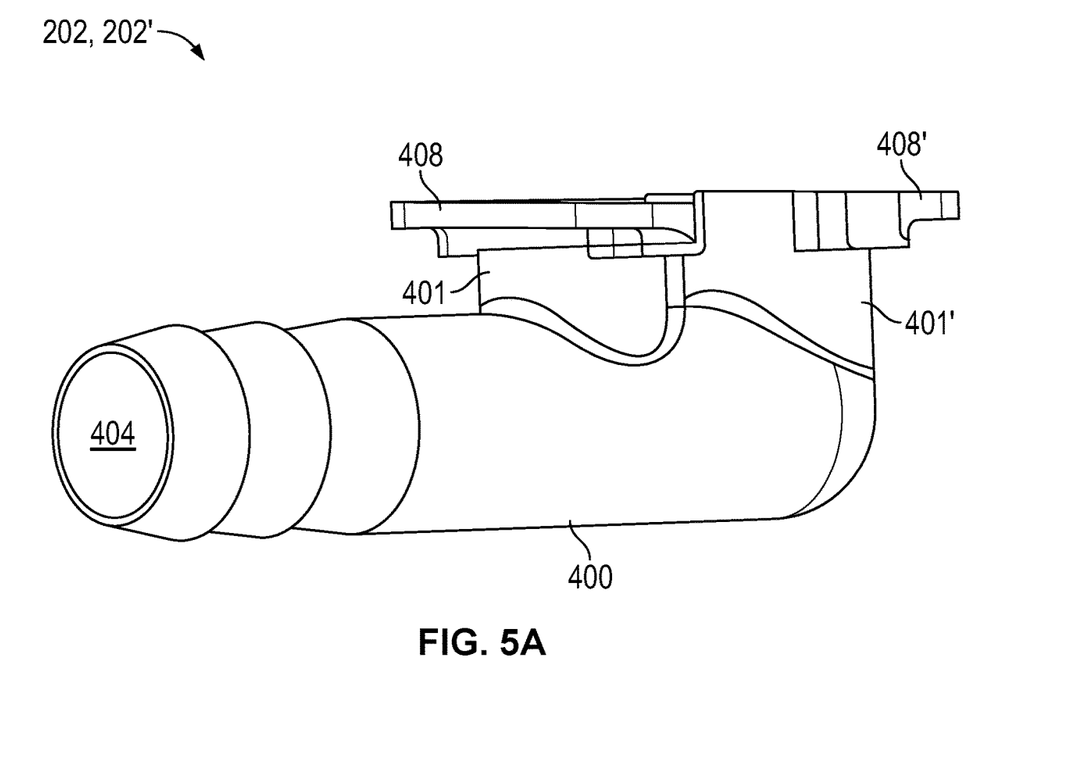
FIGS. 5A and 5B show an asymmetric flowmeter manifold according to an embodiment.
Figure 5B:
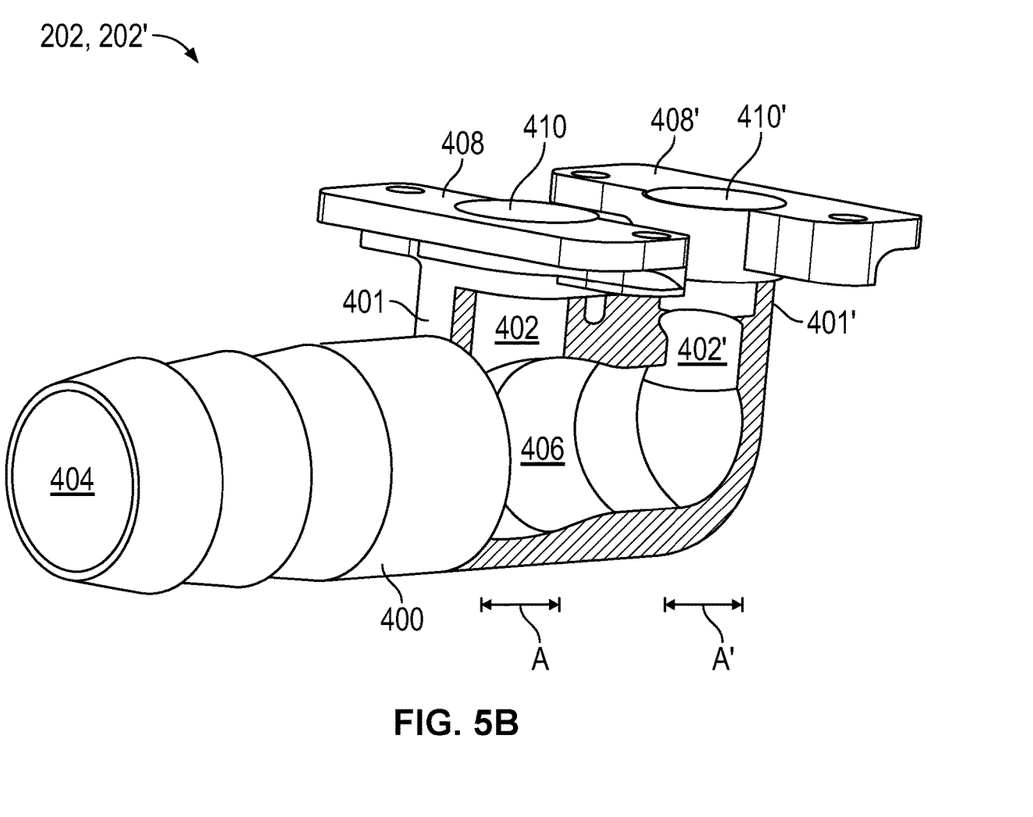

Turning to FIGS. 5A and 5B, an asymmetric manifold 202, 202' is illustrated. FIG. 5B is a partial cutaway view of the manifold illustrated in 5A. The asymmetric manifold 202, 202' has a body 400 that defines a plurality of runners 401, 401', which further define flow paths 402, 402'. A first port 404 and a plenum chamber 406 are also defined by the body 400. The first port 404 is in fluid communication with the plenum chamber 406, as are the flow paths 402, 402'. A flange 408, 408' may, in an embodiment, be located proximate each runner port 410, 410' to provide attachment means to conduits 203A, 203B. A fluid introduced into the first port 404 will travel through the plenum chamber 406, and exit the manifold 202, 202' via the runner ports 410, 410'. This would be the case for fluid traveling into a flowmeter 5. Conversely, fluid introduced into the runner ports 410, 410' will travel through the plenum chamber 406, and exit the manifold 202, 202' via the first port 404. This would be the case for fluid traveling out of a flowmeter 5. The flow paths 402, 402' each define an area, A and A' respectively. There will be greater flow in one of the tubes as a result of the asymmetric design. In an embodiment the area A is greater than A'. In an embodiment the area A is less than A'. This may be effectuated by altering the respective diameters of the flow paths 402, 402'. In an embodiment, the flow paths 402, 402' may comprise non-circular sections. Changing the shape of a non-circular section may alter the size of respective areas A, A' of the flow paths 402, 402'.

A change to the areas in one of the two flow paths 402, 402' can be made to equalize the flow in each conduit 203A, 203B. The uniformity of flow with this approach could be designed to be optimum at a certain flow rate and viscosity. Therefore, the range of flow rates and viscosities could be fine-tuned based on the area ratio between the flow paths 402, 402'. For example, if a flowmeter were to be used solely for gasoline metering, the fluid would be known so the density range would be taken into account, as would the flow rate range, based on the application. This is merely an example of an application, and should in no way limit the scope of the claims.

Additionally, for a specific application, the flow paths 402, 402' could be varied as described herein to additionally compensate for inlet flow conditions, gravitational orientation within the sensor assembly 200, and inlet/outlet conditions as may be encountered in various metering systems. Overall, based on the application and additional variables, as noted above, the areas A, A' are adjusted such that flow through each conduit 203A, 203B is distributed equally such that fluid measurements of the flowmeter 5 are accurate.

As noted above, the asymmetric manifold 202, 202' could be constructed of a single piece of material. The asymmetric nature and prominent right angles allow the asymmetric manifold 202, 202' to be molded, such as via permanent mold casting, for example without limitation. In an embodiment, the permanent mold casting process utilizes cores to form right angle flow paths. This is merely an example, as other molding, injection molding, casting, forming, and machining processes are contemplated, as are any process known in the art for forming a single-piece manifold as described herein.

Figure 6:
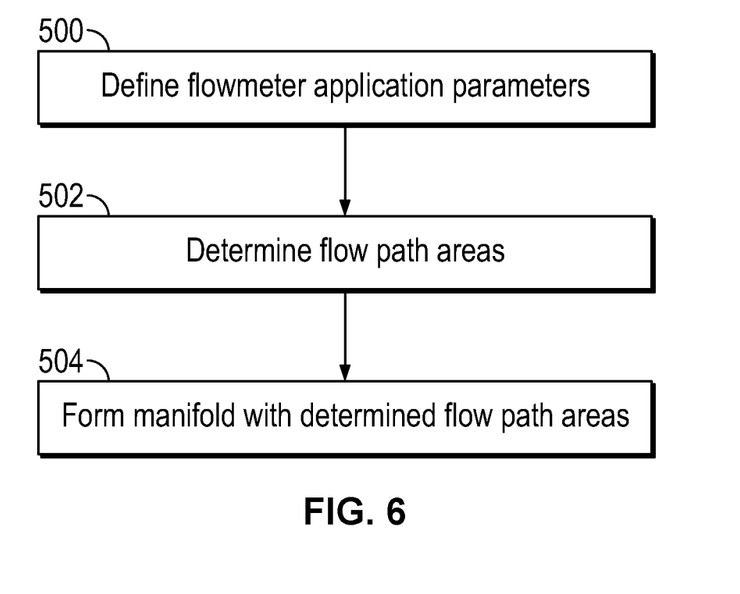
FIG. 6 is a flow chart illustrating a process for creating a manifold according to an embodiment.

FIG. 6 illustrates a method of forming an asymmetric manifold 202, 202'. In step 500, the flowmeter application and related parameters would be determined. This step provides the constraints for determining the asymmetric manifold 202, 202' morphology. The fluid density range, flow rate range, temperature range, flowmeter size, and any other relevant design constraint is determined. In step 502, the areas of the flow paths 402, 402' are calculated based upon the parameters defined in step 500. In step 504, the asymmetric manifold 202, 202' is formed having different first and second flow path 402, 402' areas. Therefore, flow rates through the conduits 203A, 203B are rendered equal, given a predetermined range of operating conditions.

Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention. Accordingly, the scope of the invention should be determined from the following claims.

I claim:

1. A method for creating an asymmetric flowmeter manifold, comprising the steps of:
   defining at least one flowmeter application parameter;
   determining an area for at least a first flow path and a second flow path; and
   forming the asymmetric manifold with the determined flow path areas.

2. The method of claim 1, wherein the application parameters comprise at least a fluid viscosity range and a flow rate range.

3. The method of claim 1, wherein an area of the first flow path is greater than an area of the second flow path.

4. The method of claim 1, wherein at least one flow path comprises a circular cross-section.

5. The method of claim 1, wherein at least one flow path comprises a non-circular cross-section.

6. The method of claim 1, comprising the step of forming a first port, wherein the first and second flow paths are disposed approximately 90 degrees to the first port.

7. The method of claim 1, wherein the step of forming the manifold comprises forming the manifold of a single piece of material.

8. The method of claim 7, wherein the step of forming the manifold of a single piece of material comprises permanent mold casting.

9. The method of claim 7, wherein the step of forming the manifold of a single piece of material comprises injection molding.

10. The method of claim 3, wherein flow rates of a fluid passing through the first flow path and the second flow path are substantially equal.

11. A flowmeter (5) configured to measure a property of a process fluid therein, comprising:
- a sensor assembly (200) in communication with a meter electronics (220) comprising a processing system (303) and a storage system (304);
- a plurality of pickoffs (205, 205') affixed to conduits (203A, 203B);
- a driver (204) affixed to flowmeter (5) conduits (203A, 203B); and
- at least one asymmetric manifold (202, 202') in fluid communication with the conduits (203A, 203B), wherein the at least one asymmetric manifold (202, 202') comprises at least a first flow path (402) proximate a first conduit (203A) and a second flow path (402') proximate a second conduit (203B), wherein an area of the first flow path (402) is greater than an area of the second flow path (402').

12. The flowmeter (5) of claim 11, comprising a Coriolis mass flowmeter.

13. The flowmeter (5) of claim 11, wherein at least one flow.

14. The flowmeter (5) of claim 11, wherein at least one flow path (402, 402') comprises a non-circular cross-section.

15. The flowmeter (5) of claim 11, comprising a first port (202A, 202B), wherein the first and second flow paths (402, 402') are disposed approximately 90 degrees to the first port (202A).

16. The flowmeter (5) of claim 11, wherein the at least one asymmetric manifold (202, 202') comprises a single piece of material.

17. The flowmeter (5) of claim 16, wherein the at least one asymmetric manifold (202, 202') comprises a permanent mold casting.

18. The flowmeter (5) of claim 16, wherein the at least one asymmetric manifold (202, 202') comprises injection molding.

19. The flowmeter (5) of claim 11, wherein flow rates of a fluid passing through the first flow path (402) and the second flow path (402') are substantially equal.

20. The flowmeter (5) of claim 11, additionally comprising a symmetric manifold (207).

* * * * *

UNITED STATES PATENT AND TRADEMARK OFFICE
CERTIFICATE OF CORRECTION

Page 1 of 1

PATENT NO. : 10,627,276 B2
APPLICATION NO. : 15/776180
DATED : April 21, 2020
INVENTOR(S) : David Skinkle It is certified that error appears in the above-identified patent and that said Letters Patent is hereby corrected as shown below:

In the Claims

Column 10, Line 9, cancel the text beginning with "13. The flowmeter (5)" to and ending "flow." in Column 10, Line 10, and insert the following claim:
--13. The flowmeter (5) of Claim 11, wherein at least one flow path (402, 402') comprises a circular cross-section.--

Signed and Sealed this
Third Day of November, 2020

Andrei Iancu
*Director of the United States Patent and Trademark Office*